(12) United States Patent
Schade et al.

(10) Patent No.: US 6,356,381 B1
(45) Date of Patent: Mar. 12, 2002

(54) MULTI-WAVELENGTH CROSS-CORRELATOR FOR ULTRASHORT RADIATION PULSES

(75) Inventors: Wolfgang Schade, Goslar (DE); David L. Osborn; Stephen R. Leone, both of Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/219,497

(22) Filed: Dec. 18, 1998

Related U.S. Application Data

(60) Provisional application No. 60/068,318, filed on Dec. 19, 1997.

(51) Int. Cl.$^7$ .................................................. G02F 1/35
(52) U.S. Cl. ........................ 359/326; 359/561; 250/216
(58) Field of Search ................................. 359/326, 327, 359/328, 561; 250/216

(56) References Cited

U.S. PATENT DOCUMENTS

| | | | |
|---|---|---|---|
| 4,148,587 A | 4/1979 | Erdmann et al. | 356/356 |
| 4,389,093 A | 6/1983 | Jackson | 350/162.14 |
| 4,413,905 A | 11/1983 | Holzapfel | 356/5 |
| 4,519,046 A | 5/1985 | Cole | 364/822 |
| 4,718,121 A | 1/1988 | Epworth | 455/619 |
| 4,755,745 A | 7/1988 | Cohen | 324/77 |
| 4,792,230 A | * 12/1988 | Naganuma et al. | 356/345 |
| 5,323,260 A | 6/1994 | Alfano et al. | 359/244 |
| 5,778,016 A | 7/1998 | Sucha et al. | 372/38 |

OTHER PUBLICATIONS

"Picosecond Optoelectronic Detection, Sampling, and Correlation Measurements in Amorphous Semiconductors"; D. H. Auston, Et Al.; Appl. Phys. Lett; Aug. 15, 1980.

"Multiple— and Single–Shot Autocorrelator Based on Two–Photon Conductivity in Semiconductors"; Yoshihiro Takagi, Et Al; Optics Letters, vol. 17, No. 9; May 1, 1992.

"Cross–Correlation Measurements on a High Repetition Rate, Femtosecond Optical Parametric Oscillator"; D.E. Spence, Et Al.; Optics Communications; Jul. 1, 1995.

"Sensitive Optical Autocorrelator Based on Two–Photon Absorption in an AlGaAs Waveguide for Studying InGaAs/InP Lasers"; A.M. Georgievski, Et Al.; Instruments and Experimental Techniques, vol. 39, No. 1; 1996.

(List continued on next page.)

Primary Examiner—Frank G. Font
Assistant Examiner—Roy M. Punnoose
(74) Attorney, Agent, or Firm—Sheridan Ross P.C.

(57) ABSTRACT

In accordance with the present invention, a multi-wavelength cross-correlator for two radiation pulses is disclosed. In one embodiment, a method for operating the cross-correlator is disclosed. A first radiation pulse is focused upon the photodiode. A second radiation pulse is also focused on the photodiode where the first and second radiation pulses illuminate a common point on the photodiode. The first and second radiation pulses, which have different wavelengths, are converted into a photocurrent using the photodiode where the product of the first and second intensities is proportional to the photocurrent. An amplitude of the photocurrent is detected while varying the delay of at least one of the first and second radiation pulses. In another embodiment, a multi-wavelength cross-correlator includes a radiation detector and a current detector. The radiation detector converts energy from the first and second radiation pulses, which have different wavelengths, into a current. The first radiation pulse contacts a first area of the radiation detector and the second radiation pulse contacting a second area of the detector with the first and second areas overlapping. The current sensor determines an amplitude of the current.

20 Claims, 5 Drawing Sheets

OTHER PUBLICATIONS

"Light–Emitting Diodes as Measurement Device for Femtosecond Laser Pulses"; D. T. Reid, Et Al.; Optics Letters, vol. 22, No. 4; Feb. 15, 1997.

"Femtosecond Autocorrelation Measurement Based on Two–Photon Photoconductivity in ZnSE"; W. Rudolph, Et Al.; Optics Letters; vol. 22, No. 5; Mar. 1, 1997.

"Autocorrelation Measurement of 6–fs Pulses Based on the Two–Photon–Induced Photocurrent in a GaAsp Photodiode", Jinendra K. Ranka, Et Al.; Optics Letters, vol. 22, No. 17; Sep. 1, 1997.

"Polarization Dependence of Two–Photon Absorption in an AlGaAs Waveguide Autocorrelator"; M. Mehdi Karkhanehchi, Et Al.; Applied Optics, vol. 36, No. 30; Oct. 20, 1997.

"Two–Photon Photoconductivity in SiC Photodiodes and Its Application to Autocorrelation Measurements of Femtosecond Optical Pulses"; T. Feurer, Et Al.; Applied Physics B; 1997.

"Femtosecond Ultraviolet Autocorrelation Measurements Based on Two–Photon Conductivity in Fused Silica"; Alexandre M. Streltsov, Et Al.; Optics Letters, vol. 23, No. 10; May 15, 1998.

"Two–Photon Photoconductivity in Semiconductor Waveguide Autocorrelators", Peter M.W. Skovgaard, Et Al.; Optics Communications; Jul. 15, 1998.

* cited by examiner

MULTI-WAVELENGTH CROSS-CORRELATOR FOR ULTRASHORT RADIATION PULSES

CROSS REFERENCE TO RELATED APPLICATION

The present application claims priority from U.S. Provisional Application Serial No. 60/068,318 filed Dec. 19, 1997.

FIELD OF THE INVENTION

The field of the invention relates to calibration and characterization of radiation sources in the near and far field and, more particularly, to cross-correlation of two ultrashort radiation pulses of different wavelengths.

BACKGROUND INFORMATION

Ultra-short laser pulses are used for many applications today. Characterizing a temporal profile of an intensity of the ultra-short laser pulse is often necessary. The process of calibrating often involves performing cross-correlation of an uncalibrated laser pulse with a laser pulse of shorter duration, hereinafter, a "probe" pulse. By cross-correlating, the temporal profile of the uncharacterized pulse can be determined as well as the temporal overlap between the uncharacterized and probe pulses. In performing cross-correlation, the probe pulse has a different wavelength than the uncalibrated laser pulse. Nonlinear optical processes have been developed to accomplish cross-correlations using harmonic generation to produce sum or difference frequency generation for two different wavelengths (cross-correlation).

Conventional cross-correlators involve focusing the uncalibrated and the probe pulse on a non-linear crystal. The two pulse paths are generally 5–10% off a normal plane defined by an input surface of the non-linear crystal such that each pulse is offset on a different side of the normal plane. The pulse paths are focused on non-overlapping points of the non-linear crystal's input surface so that the paths of the two pulses converge at a spot within the non-linear crystal. Filters are placed on an output side of the non-linear crystal to block the strong primary beams of each radiation source. When properly configured, the non-linear crystal generates a sum frequency of the two incident laser pulses in a two-photon process. A photomultiplier or the like is placed at a point between the two primary beams leaving the non-linear crystal so that the intensity of the sum frequency may be measured. To achieve a phase matching angle so that the two radiation sources generate a sum frequency beam, the non-linear crystal must be tilted. Once the matching angle is achieved, the photomultiplier measures the sum frequency beam which resulted from the two-photon process.

As those skilled in the art can appreciate, the sum frequency beam requires a photon from the uncalibrated radiation pulse and a photon from the probe pulse to generate a photon in the sum frequency beam. So the sum frequency beam is only present when both radiation beams are properly focused on the same surface of the non-linear crystal at the same time (i.e., both radiation beams temporally overlap). Since the characteristics of the probe pulse are well known, the portion of the sum frequency beam attributable to the uncalibrated pulse may be determined by analyzing a signal from the photomultiplier. The width of the probe pulse can be much smaller than the uncharacterized pulse so that thin slices of the uncharacterized pulse may be sequentially analyzed to determine the cross-correlation.

Conventional cross-correlators provide for adjusting the time at which the probe pulse converges with the uncharacterized pulse. A variable delay line or the like can be used so that the probe pulse can successively scan the uncharacterized pulse. In this way, slices of the uncharacterized pulse can be measured so that the intensity profile over time may be characterized.

As those skilled in the art can appreciate, the conventional technique of using a non-linear crystal to perform cross-correlation has many disadvantages. This technique requires a special non-linear crystal with a high non-linear coefficient for the incident light beams and sufficient transmission of the crystal material for the generated new frequencies to pass therethrough. Additionally, the crystal has to be phase matched to the incoming laser wavelengths, the laser beams have to be imaged accurately into the crystal material to obtain the high field strengths necessary for the non-linear process, and a sensitive detector (e.g. a photomultiplier) is required for measuring the weak intensity of the newly generated frequencies resulting from the non-linear process. Furthermore, the non-linear crystals are expensive and are not easily adaptable to uncharacterized pulses of many different wavelengths. Accordingly, there is a need for a cheaper and simpler way to perform cross-correlation of two radiation sources having different wavelengths.

SUMMARY OF THE INVENTION

In accordance with the present invention, a multi-wavelength cross-correlator for two radiation pulses is disclosed. Cross-correlation is performed in order to characterize a temporal profile of radiation pulses and a temporal overlap between two radiation pulses. Cross-correlations are used for calibrating a two radiation pulse system which assures both radiation pulses spatially and temporally overlap at a desired point. In one embodiment, a method for operating the cross-correlator is disclosed. The method includes the following steps:

(a) focusing the first radiation pulse on the photodiode (the first radiation pulse having a first intensity and a first wavelength);

(b) focusing the second radiation pulse on the photodiode where the first and second radiation pulses illuminate a common point on the photodiode (the second radiation pulse having a second intensity and a second wavelength), wherein the first and second wavelengths are different;

(c) converting the first and second radiation pulses into a photocurrent using the photodiode (where the product of the first and second intensities is proportional to the photocurrent); and (d) detecting an amplitude of the photocurrent while varying the delay of at least one of the first and second radiation pulses.

Based upon the measured amplitude of the photocurrent, the product of the first intensity and the second intensity can be determined.

In another embodiment, a multi-wavelength cross-correlation system includes:

(a) a first radiation pulse;

(b) a second radiation pulse (the first and second radiation pulses having different wavelengths);

(c) a radiation detection means (e.g., a semiconductor), which converts energy from the first and second radiation pulses into a current, the first radiation pulse contacting a first area of the radiation detection means and the second radiation pulse contacting a second area of the radiation detection means with the first and second areas overlapping; and (d) a current sensing means (e.g., a sensitive current meter and/or a chopper and lock-in amplifier) for determining an amplitude of the current.

The invention is useful for measurement of both femtosecond and picosecond laser pulses. In general, any commercial photodiode can be used for this device, depending on the band gap energy and the wavelengths of the applied lasers in terms of their photon energy and intensity. Therefore the wavelength ranges that can be cross-correlated is greatly extended. Because a photodiode is much less expensive and easier to align than a non-linear crystal and a separate detector (e.g., a photomultiplier) and since the operation of the invention is much more straightforward, it can replace conventional non-linear optical processes for cross-correlation measurements. The cross-correlator is particularly effective when the first and second radiation pulses each have a wavelength ranging from the ultraviolet to the mid-infrared and a duration in the range from several picoseconds to a few femtoseconds.

Based upon the foregoing summary, a number of important advantages of the present invention are readily discerned. By using an inexpensive photodiode, the costs associated with the non-linear crystal and photomultiplier are avoided. Further, the two radiation source only need to spatially overlap on the photodiode, so the extensive alignment procedures of the conventional cross-correlators are unnecessary. Further still, the use of a photodiode increases the wavelengths which may be cross-correlated. Additional advantages of the present invention will become readily apparent from the following discussion, particularly when taken together with the accompanying drawings.

DETAILED DISCLOSURE

The present cross-correlator provides a simple device for measuring two-color cross-correlations of ultrashort radiation pulses. The cross-correlator has several advantages compared to conventional cross-correlators: (1) complicated alignment and imaging of the incident laser beams is avoided; (2) phase matching is not required; (3) a wide range of possible wavelength combinations is possible; and (4) there is no need for a non-linear crystal or a separate detector.

Figure 1:
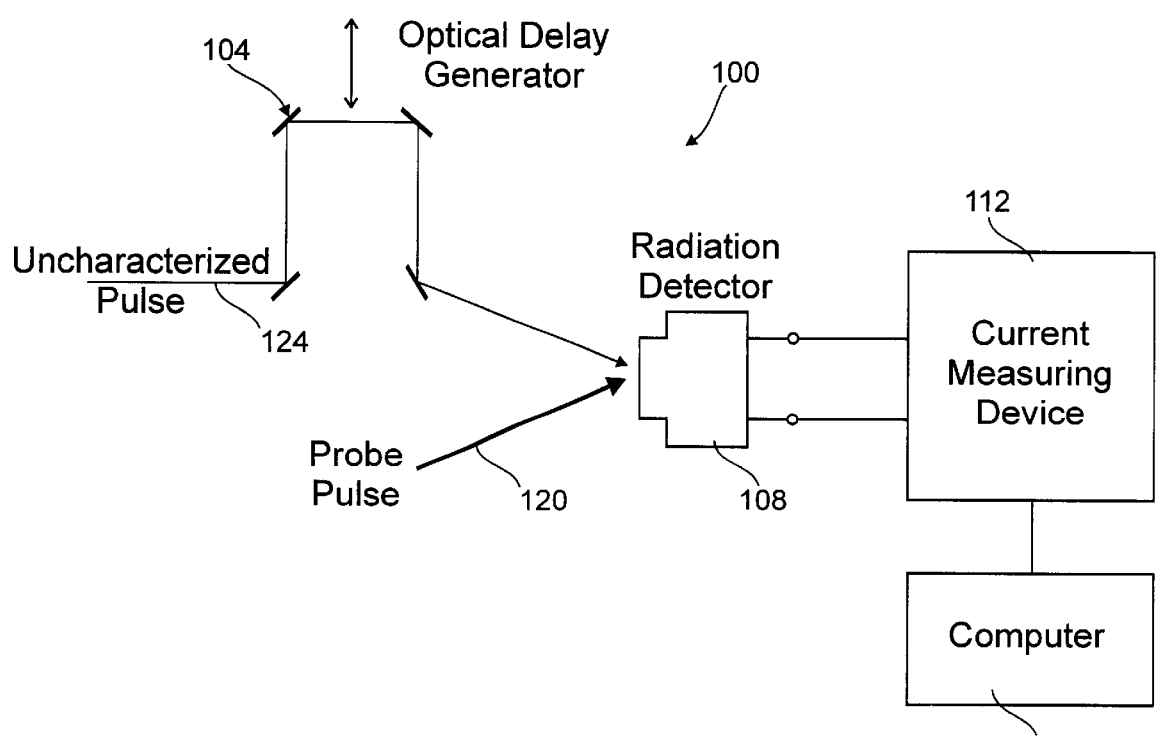
FIG. 1 is a block diagram which schematically shows an embodiment of the multi-wavelength cross-correlator.

With reference to FIG. 1, an embodiment of the multiple-wavelength cross-correlator is shown in block diagram form. The cross-correlator 100 includes an optical delay generator 104, a radiation detector 108, a current measuring device 112, and a computer 116. A probe radiation pulse 120 and an uncharacterized radiation pulse 124 are provided to the cross-correlator so that the uncharacterized radiation pulse 124 may be characterized. The uncharacterized radiation pulse 124 is passed through the optical delay line 104 so that time relationship between the probe radiation pulse 120 and uncharacterized radiation pulse 124 can be manipulated. The radiation detector 108 is used to detect a two-photon photocurrent which changes as the intensity of both radiation pulses 120, 124 changes. To measure the current through the radiation detector 108, the current measuring device 112 is coupled to the radiation detector 108. The computer 116 coupled to the current measuring device 112 is used to log the current measurements and determine the characteristics of the uncharacterized radiation source 124 from those current measurements.

The cross-correlator includes the optical delay generator 104 which changes the time either of the probe or uncharacterized radiation pulses 120, 124 will reach the radiation detector 108 by, for example, altering the optical path length difference between the radiation pulses 120, 124. In FIG. 1, only the uncharacterized radiation pulse 124 is engaged by the optical delay generator 104. The optical delay generator 104 adjusts at least one radiation pulse 124 so that both 120, 124 temporally overlap at the radiation detector 108. The preferred type of optical delay generator 124 is an optical delay line. The optical delay line 104 allows the path of one laser to be lengthened or shortened. Since radiation travels at a known speed, modifying the length of the path will change the time at which the radiation pulse 124 reaches the radiation 15 detector 108. The ability to adjust the time in this way, allows both radiation pulses 120, 124 to overlap each other in time. Overlap is desirable because when there is overlap the sum of the two photons (two-photon absorption) should exceed the band gap energy and cause a photocurrent, over and above the background photocurrent, to flow. It is noted, reflective and not refractive optics are most preferred for manipulation of the radiation pulses 120, 124 because reflective optics generally introduce the least modification to the pulse within the device. It is further noted, relatively fine alterations (i.e., alterations much less than the wavelength of either radiation pulse 120, 124) in optical path length can be realized by the use of an interferometer which has a piezoelectric transducer mounted on a variable arm of the interferometer.

Figure 7:
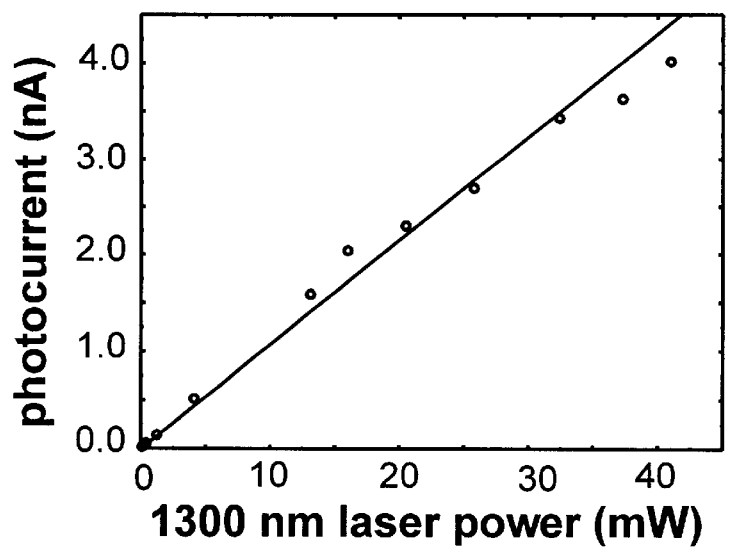
FIG. 7 is a graph of the photocurrent as the uncalibrated pulse increases in power, where the uncalibrated pulse power is along the abscissa and the photocurrent of the diode is along the ordinate direction.

The radiation detector 108 can include any photoresponsive semiconductor, with a photodiode being most preferred. The preferred embodiment uses a photodiode as a radiation detector 108 because it converts radiation into a photocurrent. As can be appreciated, the photodiode 108 has two electrical terminals with a p-layer and n-layer semiconductor therebetween. The electrical terminal attached to the p-layer is called an anode while the electrical terminal attached to the n-layer is called a cathode. When sufficient light is focused upon the p-layer of the photodiode 108 in this embodiment, a two-photon photocurrent will flow from anode to cathode. The two-photon photocurrent is produced by two photons, one from each radiation pulse 120, 124, colliding with an electron within an atom to move the electron from the valence to the conduction band. If the sum energy of the probe and uncharacterized laser pulses 120, 124 incident upon the p-layer does not exceed the band gap energy required by a particular photodiode 108, only a "background" photocurrent will flow until the band gap energy is exceeded. After the sum energy of the probe and uncharacterized laser pulses 120, 124 exceeds the band gap energy, the current will generally respond linearly to increases in laser light intensity of either laser pulse 120, 124, as shown in FIG. 7. The background photocurrent is generally comprised of single-photon photocurrents and two-photon photocurrents from each radiation pulse alone. The contribution to the background photocurrent from each radiation pulse 120, 124 may be determined by measuring the photocurrent when only one radiation pulse is incident upon the photodiode 108. Determining the background photocurrent in this way allows calibrating away each radiation pulse's 120, 124 contribution to the background photocurrent.

A photodiode 108 with different band gap energy can be chosen so that a desired energy of either radiation pulse 120, 124 alone will not exceed the band gap energy for the chosen photodiode 108. Preferred photodiode materials include GaAsP, Si, GaAs, GaP, ZnSe, InSnO and all other photosensitive semiconductor materials. The most preferred photodiode is a diffusion-type GaAsP. The diffusion-type GaAsP photodiode 108 is used in the preferred embodiment because the band gap energy was not exceeded by either the 775 nm laser pulse or 1300 nm laser pulse alone. Photodiodes made from Si, GaAs, GaP, ZnSe, or other materials could be used to cover a wider range of band gap energies and radiation wavelengths which could include the energies of the infra red, visible, and ultra violet spectra.

As can be appreciated, the energy of the radiation pulses 120, 124 affects which photodiode 108 has the best band gap characteristics for cross-correlation. Care must be taken to select a photodiode 108 with a band gap energy requirement greater than the energy of either radiation pulse 120, 124 alone. However, the sum of the energies of the probe and uncharacterized radiation pulses 120, 124 should be greater than the band gap energy of the photodiode 108. With the proper photodiode 108, neither pulse 120, 124 alone will generate more than the background photocurrent unless the energies of both pulses 120, 124 combine in a two-photon process to exceed the band gap energy.

Spatial overlap on the surface of the p-layer of the photodiode 108 is necessary for performing cross-correlation. The probe pulse 120 is focused on a first area of the p-layer and the uncharacterized pulse 124 is focused on a second area of the p-layer. The first area must overlap the second area so the sum of the photon energies (two-photon absorption) exceeds the band gap energy. When the first and second areas overlap and illuminate a common point on the p-layer of the diode 108 a photocurrent in excess of the background photocurrent will flow because the two-photon absorption exceeds the band gap energy.

In other embodiments, the cross-correlator can include a number of photodiodes 108, each having a different band gap and commonly being composed of a different material. The photodiodes 108 can be mounted on a common surface so that the photodiodes 108 can be selectively rotated or moved into position, as needed for the energies of the laser pulses 120, 124 being used. In this manner, the cross-correlator would be usable over a wide wavelength range (e.g., UV-VIS-IR).

The current measuring device 112 is used to determine the photocurrent produced by the to radiation detector 108. One example of a current measuring device 112 is a sensitive current meter, e.g., an electrometer. Current meters 112 typically have a first and second terminal. The first terminal is attached to the anode while the second is attached to the cathode of the radiation detector 108. The photocurrent that flows can be analyzed to determine the product of the intensities of the two laser pulses 120, 124 because photocurrent is generally proportional to the product of the light intensity of both pulses 120, 124.

Figure 2:
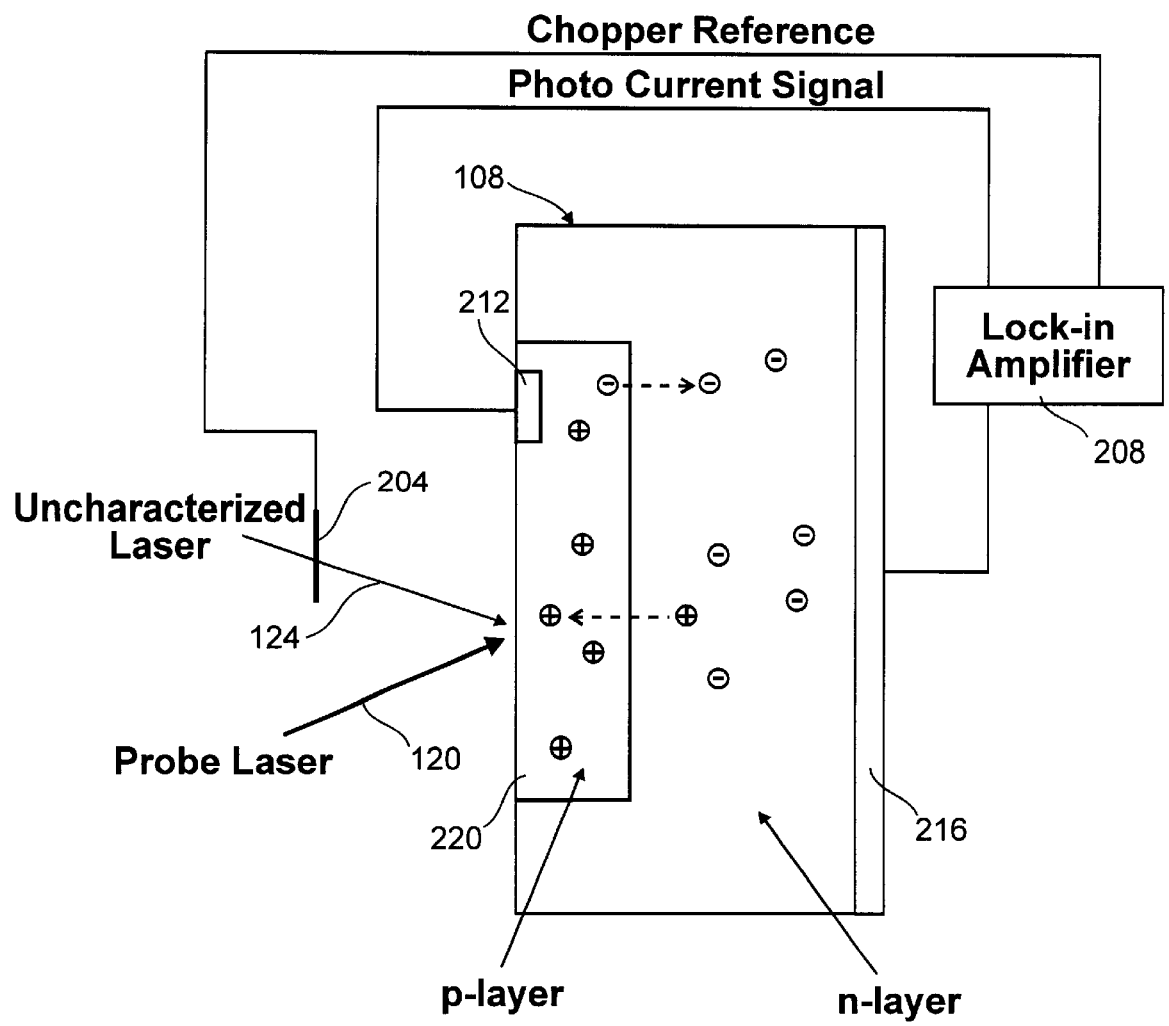
FIG. 2 is a block diagram schematically depicting another embodiment of the cross-correlator which includes a chopper and lock-in amplifier.

FIG. 2 depicts another embodiment of the invention in block diagram form. This embodiment utilizes a chopper 204 and a photocurrent sensor 208 to improve the sensitivity of current measurement. When light of an adequate intensity is focused upon the photodiode 108 a photocurrent flows from an anode 212 to a cathode 216 of the diode 108. The chopper 204 operatively engages at least one radiation pulse 124 to divide the radiation into pulses at a known frequency. In this way, the photocurrent is locked in-phase with the chopper 204 to provide more accurate current sensing with the photocurrent sensor 208. The chopper 204 could take the form of a mechanical chopping wheel or an electrooptical switch while the photocurrent sensor 208 could take the form of a lock-in amplifier. The lock-in amplifier 208, which is synchronized with the chopping wheel 204, senses the small pulses of current generated within photodiodes 108.

The probe and uncharacterized radiation pulses 120, 124 can be temporally aligned in some time intervals but not in others. For example, in a first time interval, the probe and uncharacterized radiation pulses 120, 124 may simultaneously illuminate the common point, and, in a second time interval different from the first time interval, the probe and uncharacterized radiation pulses 120, 124 may not simultaneously illuminate the common point. As explained more fully above, photocurrent in excess of the background photocurrent only flows when both pulses 120, 124 illuminate a common point during the same time interval. In other words, a photocurrent is typically measured only during discrete time intervals and not continuously.

The probe and uncharacterized radiation pulses 120, 124 are produced by one or more radiation sources. The radiation source can be any suitable radiation source, with a laser being most preferred. In yet another embodiment shown in FIG. 6, an argon laser 604 is used to pump a mode locked titanium-sapphire laser 608. The titanium-sapphire laser 608 produces the probe laser pulse 120 with a duration of 100 femtoseconds (fs) and a wavelength of 775 nanometers (nm). The probe laser pulse 120 also synchronously pumps an optical parametric oscillator (OPO) 612 which at least produces the uncharacterized laser pulse 124 with a duration of 170 fs and a tunable wavelength of 1300 nm. In this way, a single laser 604 is used to power a titanium-sapphire laser 608 which feeds a probe pulse 120 to an OPO 612 to produce an uncharacterized laser 124. Since the probe laser pulse 120 in conjunction with the OPO 612 synchronously produces the uncharacterized laser pulse 124, both laser pulses 120, 124 are generally aligned in time. It should be noted, the idler laser output from the OPO 612 is not used in this embodiment, although other embodiments could use the idler laser. Fine adjustments to the time alignment of the uncharacterized laser pulse 124 with respect to the probe laser pulse 120 are made with the optical delay generator 104. Each laser pulse 120, 124 has an intensity and energy. As those skilled in the art can appreciate, the intensity is a measure of the number of photons or brightness of each laser pulse 120, 124, while the energy is a function of the wavelength or frequency.

Figure 3:
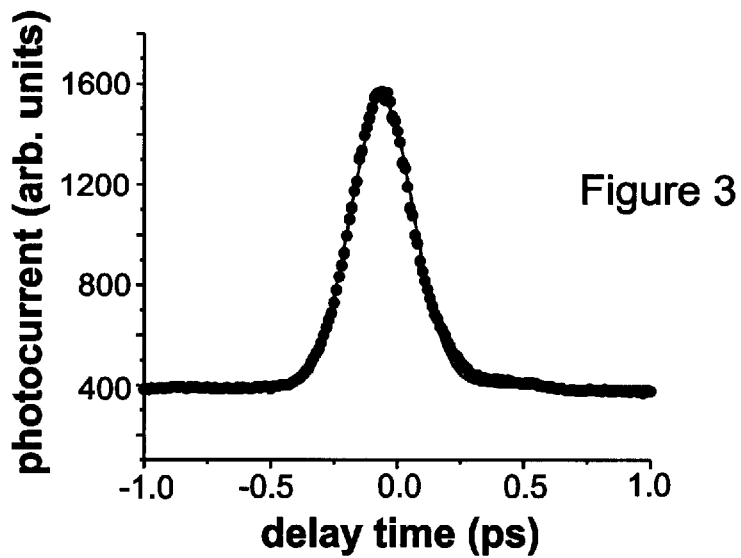
FIG. 3 is a graph of a cross-correlation signal for a probe pulse having a 775 nm wavelength and an uncalibrated pulse having a wavelength of 1290 nm with a Gaussian curve applied to the data points, where the time delay is along the abscissa and the photocurrent is along the ordinate direction.
Figure 4:
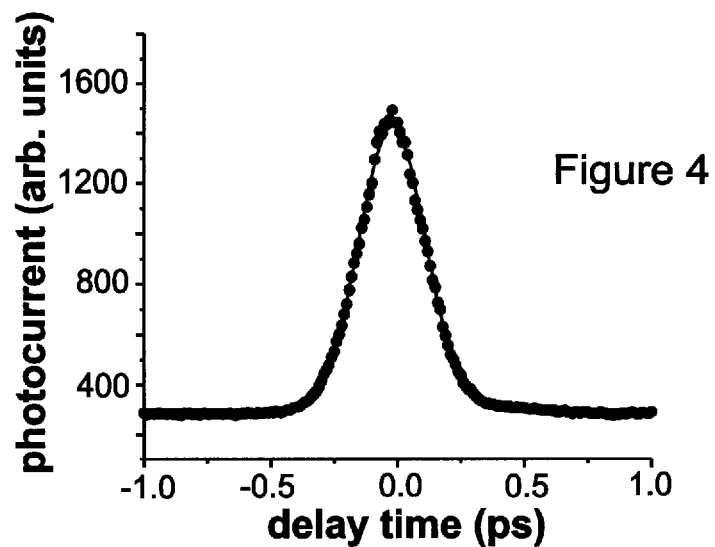
FIG. 4 is a graph of a cross-correlation signal for a probe pulse having a 775 nm wavelength and an uncalibrated pulse having a wavelength of 1300 nm with a Gaussian curve applied to the data points.
Figure 5:
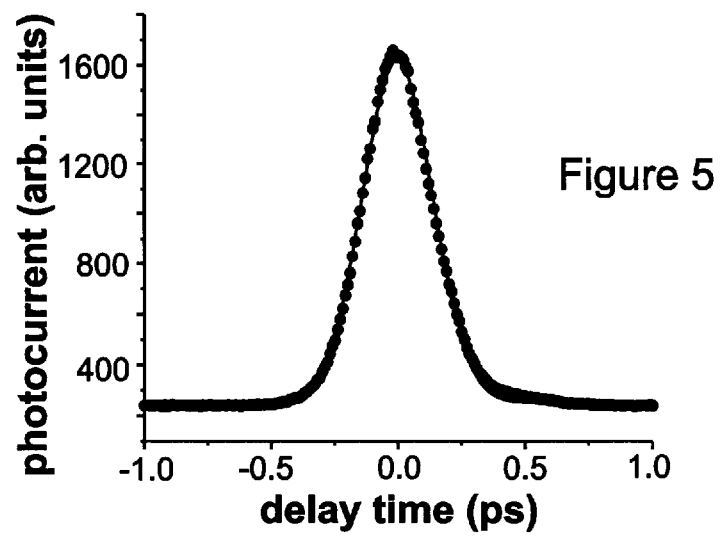
FIG. 5 is a graph of a cross-correlation signal for a probe pulse having a 775 nm wavelength and an uncalibrated pulse having a wavelength of 1310 nm with a Gaussian curve applied to the data points.

In FIGS. 3–5, femtosecond cross-correlation signals for three different wavelength pairs are recorded by measuring the two-photon induced photocurrent in a GaAsP photodiode as a function of the optical delay. FIG. 3 shows cross-correlation of a first laser pulse 120 ($\lambda_1$=775 nm) and a second laser pulse 124 ($\lambda_2$=1290 nm) where $\Delta t_{cc}$=(273±5) fs, FIG. 4 shows cross-correlation of a first laser pulse 120 ($\lambda_1$=775 nm) and a second laser pulse 124 ($\lambda_2$=1300 nm) where $\Delta t_{cc}$=(259±5) fs and FIG. 5 shows cross-correlation of a first laser pulse 120 ($\lambda_1$=775 nm) and a second laser pulse 124 ($\lambda_2$=1310 nm) where $\Delta t_{cc}$=(248±5) fs. The cross-correlation widths ($\Delta t_{cc}$) at the full width half maximum (FWHM are determined by fitting a Gaussian curve to the data points. The fitted Gaussian curve is shown in FIGS. 3–5 superimposed upon the measured data points.

With reference to FIG. 7, the power dependence of the two-photon induced cross-correlation photocurrent in the GaAsP photodiode 108 is shown. In this example, the average power for the first laser pulse 120 ($\lambda_1$=775 nm) is $P_1$=28 mW while the power of the second laser pulse 124 is changed. In this case, the first laser pulse 120 is chopped and lock-in detection is used to obtain just the cross-correlation power dependance. The graph generally shows the photocurrent varies linearly to changes in the power of the laser pulse 124.

Figure 8:
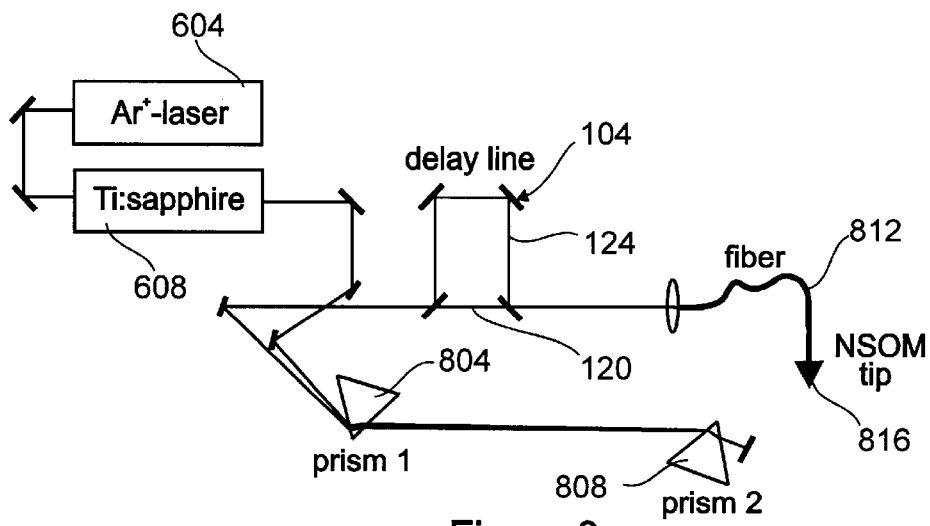
FIG. 8 is a block diagram which schematically depicts still another embodiment having prisms to compensate for the pulse chirp and an optical fiber or near field scanning optical microscope (NSOM) tip to deliver the radiation pulses.
Figure 9:
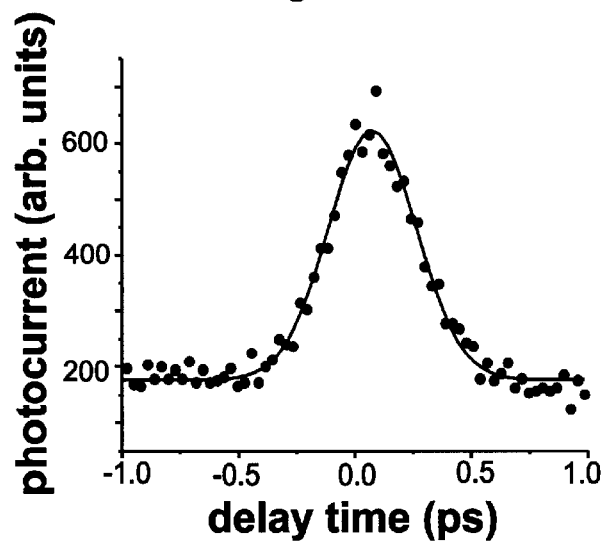
FIG. 9 is a graph of a cross-correlation signal for a probe pulse with a negative group velocity dispersion at a point before the laser pulse is sent through an optical fiber, where the time delay is along the abscissa and the photocurrent is along the ordinate direction.
Figure 10:
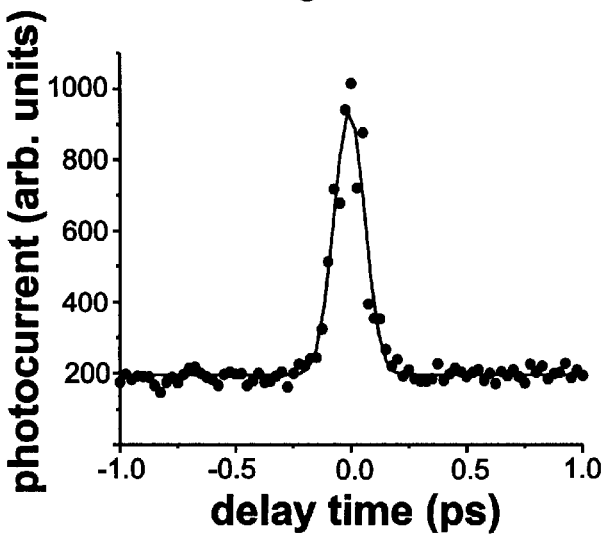
FIG. 10 is a graph of a cross-correlation signal for a probe pulse sent through an optical fiber after compensation with prisms.

FIG. 8 depicts still another embodiment of two-photon induced photocurrent measurements for the temporal characterization of femtosecond laser pulses 120, 124 and near-field fiber optics. A first and second prisms 804, 808 are used for compensation of femtosecond pulse broadening due to positive group velocity dispersion in an optical fiber 812. Both the probe and uncharacterized pulses 120, 124 are guided through the fiber 812 and out a NSOM tip 816 whereupon a photodiode 108 performs cross-correlation (not shown). FIG. 9 shows the temporal profile of a femtosecond laser pulse after only passing through the prism pair 804, 808. The measured pulse duration is $\Delta t$=(318±10) fs (FWHM), while the initial pulse duration before the prisms 804, 808 was $\Delta t$=(125±6) fs (FWHM). FIG. 10 shows the temporal profile of a femtosecond laser pulse emerging from the NSOM fiber tip 816 as measured by near-field photocurrent detection with a GaAsP photodiode as a function of the optical delay. The pulse duration emerging from the fiber tip 816 is $\Delta t$=(109±5) fs (FWHM).

DISCUSSION OF EXPERIMENTS

Two-color two-photon induced photoconductivity in a commercial GaAsP photodiode 108 is demonstrated to obtain femtosecond cross-correlation functions for different wavelength radiation pulses 120, 124. As mentioned above, this technique requires no non-linear crystal, no phase matching and no separate detector, as is the case for conventional optical cross-correlation measurements. The photodiode 108 acts as both the non-linear element and the detector needed in conventional cross-correlators. For an average power less than 100 $\mu$W at wavelengths around 1300 nm, emitted by a typical femtosecond optical parametric oscillator 612 (see FIG. 6), and an average power of 28 mW at 775 nm from a mode-locked Ti:sapphire laser 608, two-photon induced photocurrent signals are recorded directly to obtain cross-correlation functions. The only restriction for applicable wavelengths is that the sum of the photon energies $E_1$, $E_2$ of the two incident laser beams 120, 124 ($E_S$=$E_1$+$E_2$=$hv_1$+$hv_2$) is above the band gap energy $E_G$ of the semiconductor and that neither photon energies $E_1$, $E_2$ alone is larger than the band gap energy $E_G$. This method distinguishes itself by simplicity and broad wavelength coverage to obtain the cross-correlation functions of multi-wavelength ultrafast laser sources.

This invention describes how a commercial GaAsP photodiode 108 can be applied to record a cross-correlation signal for two different incident wavelengths 120, 124, (e.g., 775 nm and 1300 nm), in an easy and direct manner by measuring the induced photocurrent. In FIG. 2 a block diagram of the set-up for one embodiment is shown. The two incoming laser beams 120, 124 with the wavelengths $8_1$ and $8_2$ are focussed onto the p-layer of the photodiode 108. Contrary to conventional nonlinear optical processes, there are no specific restrictions on the alignment of the two laser beams 120, 124 on the semiconductor 220, such as phase matching, collinear imaging, focussing parameters, and polarization. The only important parameter is that both beams 120, 124 spatially overlap on the photocathode 220. In experiments, photocurrents have been measured for spot sizes between 0.5 and 10 mm². In the case of spot sizes below 0.5 mm, each individual laser beam 120, 124 produces a two-photon induced photocurrent signal, which is independent of the temporal separation of the two laser pulses 120, 124 and therefore constitutes a background signal. For data accumulation, the beam path for the first laser (775 nm) 120 is fixed while a very different wavelength for the second laser (1300 nm) 124 is changed by a computer controlled optical delay line 104. In the case of weak focussing d>0.5 mm², each laser individually can be adjusted to not induce a measurable background photocurrent in the photodiode 108. However, if the optical pathlengths of both femtosecond pulses 120, 124 are aligned in a way that both pulses 120, 124 arrive at the photodiode 108 at the same time ($\Delta t$=0), then the total photon energy $E_s$=($E_1$+$E_2$)>$E_G$, and a two-color, two-photon induced photocurrent can be measured. Recording the photocurrent can be done with a current measuring device, e.g., one of the laser beams is mechanically chopped 204 at a frequency of about 1 kHz serving as the reference signal for a lock-in amplifier 208 which measures the two-photon induced photocurrent due to the two-color process as a function of optical delay 104. During these measurements generally the beam with the lowest power is chopped. The 775 nm laser radiation may be generated by a standard mode-locked femtosecond Ti:sapphire laser 608 where the repetition rate is 82 MHz and the pulse duration is about 130 fs. This laser synchronously pumps an optical parametric oscillator 612 which gives pulses with a duration of about 214 fs that are tunable in the spectral range around 1300 nm. These individual pulse durations are independently measured with conventional non-linear crystal auto-correlation techniques.

In FIGS. 3–5, three cross-correlation traces are shown for three different wavelength combinations by measuring the two-photon induced photocurrent as the optical pathlength of one of the radiation pulses 124 is changed by the computer controlled delay line 104. The obtained full width half maximum (FWHM) of the cross-correlation signals are $\Delta t \approx 260$ fs, while the convolution of two Gaussian pulses with a duration of 130 fs and 214 fs gives a width $\Delta t = 250$ fs (FWHM), in good agreement with the experimental result of the new cross-correlator. This also demonstrates that two-color cross-correlations with pulses of different time duration are measured successfully.

The power dependence of the two-color two-photon induced photocurrent in the photodiode 108 can be shown as the power of one laser 124 is changed while the other one 120 is fixed at a constant value. A linear dependence of the photo current is obtained for both cases. This is due to the relation $I(v_1+v_2) \approx P(v_1) \cdot P(v_2)$, where I is the two-photon induced photo current and $P(v)$ is the average power of the laser light. It also demonstrates the capability of the new method to measure cross-correlation functions for two ultrashort laser pulses 120, 124 of different wavelengths that differ in power by two orders of magnitude (i.e., a factor of 100).

Two-color two-photon induced photoconductivity in a GaAsP diffusion-type photodiode 108 is demonstrated by measuring femtosecond cross-correlation functions for widely separated wavelength pairs of 775 and 1300 nm. Results are obtained for a range of tunable wavelengths and average powers of the incident lasers 120, 124 by measuring the two-photon induced photocurrent as a function of the optical delay between the pulses. The temporal autocorrelation of femtosecond laser pulses in the near-field of a small diameter aluminum coated optical fiber tip is also obtained with the same photodiode 108 method for single colors.

Recent progress in femtosecond laser technology makes it possible to generate high repetition rate, ultrashort pulses in a wide spectral range between 350 and 5000 nm with typical pulse durations of about 100 fs. This opens up new possibilities for experiments in ultrafast spectroscopy, including the characterization of semiconductors and semiconductor nanostructures. Requirements for most femtosecond pump-probe laser experiments are (1) the characterization of the temporal profile of the pulses and (2) the determination of the pump-probe temporal overlap (i.e., $\delta t = 0$ between the two pulses). These characterizations are more difficult when a two-color experiment is required.

Figure 6:
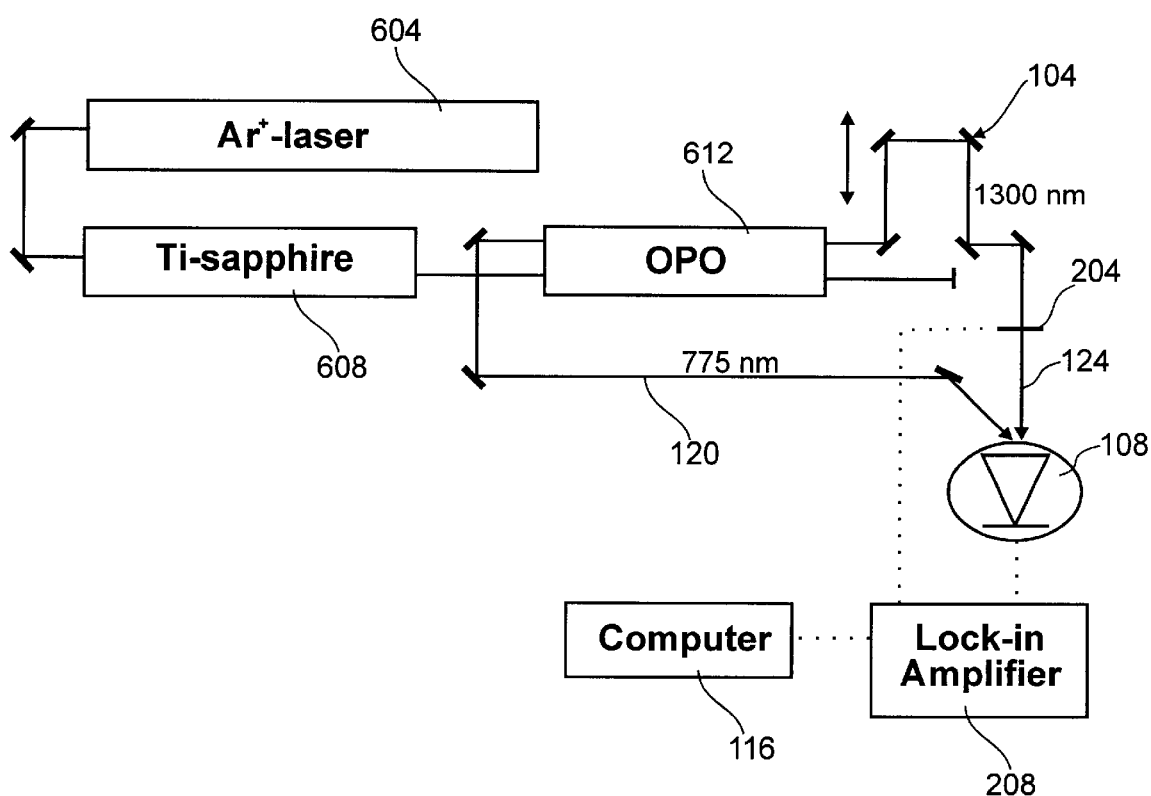
FIG. 6 is a block diagram which schematically depicts yet another embodiment which use an optical parametric oscillator.

In FIG. 6, one embodiment of the photodiode cross-correlation device is shown. Femtosecond laser pulses 120, 124 are generated by a standard mode-locked Ti:sapphire laser ($\lambda_1 = 775$ nm) 608 pumped by an Ar+ laser 604. The repetition rate is 82 MHz and the pulse duration is typically 100 fs (FWHM) for a maximum average power of about 2 W. This laser synchronously pumps an optical parametric oscillator (OPO, $\lambda_2 = 1300$ nm) 612 which gives pulses with a duration of about 170 fs F and an average power of about 200 mW, tunable in the spectral range around 1300 nm. The temporal pulse characteristics of both lasers 120, 124 are measured independently by standard nonlinear crystal autocorrelation techniques. To obtain cross-correlation signals in the present experiment the beam path of the OPO output pulse 124 is delayed by a computer controlled delay line 104. The two beams 120, 124 with wavelengths $\lambda_1$ and $\lambda_2$ are spatially overlapped on the sensitive area (p-layer) 220 of the GaAsP diffusion-type photodiode 108. Typically, the lower intensity beam 124 is mechanically chopped at 1 kHz, and the two-photon induced photocurrent is measured as a function of the optical delay. The output of the photodiode is directly connected to the current input of a lock-in amplifier (R=1 kΩ, $10^6$ gain) 208 and the response of the diode 108 is measured without an applied bias voltage. The typical setting for the time constant in the lock-in amplifier 208 was $\tau = 100$ ms.

The photodiode device 108 is also used to measure auto- and cross-correlation signals of the 780 nm femtosecond laser pulses in the near-field of an aluminum coated fiber tip 816. The diameter of the aperture was approximately 200 nm, as determined for tips 816 pulled in a similar fashion by using electron microscopy. The transmission of the light through the tip 816 was approximately $10^{-4}$ and the distance between the fiber tip 816 and the photodiode surface 108 was set by a shear force measurement. For these measurements the protective resin coating of the GaAsP photodiode 108 was carefully removed by chemical etching in order to place the near-field scanning optical microscope (NSOM) tip into the near-field of the p-layer 220 of the photodiode 108. With reference to FIG. 8, the output of the Ti-sapphire laser 608 was split into two beams with different powers at a ratio of 1:5. The weak one 120 is typically used as the chopped probe beam, while the stronger pump beam 124 was delayed by the computer controlled delay line. Experiments were performed either by guiding both beams through the fiber ($P_{1,2} \leq 1$ mW, auto-correlation) 812 or by coupling only the probe beam 120 into the fiber ($P_1 \approx 1$ mW) and imaging the pump beam ($P_2 \approx$ several mW) 124 at an angle of approximately 45° directly onto the photodiode surface to obtain overlap with the probe beam 120 that emerges from the fiber tip (cross-correlation) 816. It was found that the disadvantage of the 45° cross-correlation set-up is an enhanced shadowing effect when the distance between the fiber tip 816 and the photodiode surface z is less than about 50 nm (near-field). A less efficient overlap of the pump and probe pulses 120, 124 on the photodiode surface is obtained, and higher average powers for the pump beam 124 have to be applied to obtain a cross-correlation signal. This can reduce the spatial resolution that is obtained in NSOM experiments due to light-induced expansion of fiber tips 816. Therefore, results are only reported below for guiding both pulses 120, 124 through the fiber 812.

The GaAsP diffusion type photodiode 108 that is used in the present investigation shows a linear spectral response between 300 and 690 nm with a maximum photoconductivity around 600 nm. The band gap energy is $E_G = 1.8$ eV, which corresponds to $\lambda_g = 690$ nm. A nonlinear response in photoconductivity by two-photon absorption can be obtained for wavelengths 690 nm<$\lambda$<1380 nm. If the single photon energies $E_1$ and $E_2$ of two femtosecond laser pulses 120, 124 are both below the band gap energy $E_G$ and the optical path lengths of the laser beams 120, 124 are aligned so that both pulses arrive at the photodiode at the same time ($\delta t = 0$), then the sum photon energy is $E_S = (E_1 + E_2) > E_G$, and a two-color, two-photon induced photocurrent can be detected.

In FIGS. 7–9, cross-correlation traces are shown for several widely different wavelength combinations (775 nm and variable wavelengths around 1300 nm) by measuring the two-photon induced photocurrent as the optical path length of the 1300 nm laser beam 124 is changed by the computer controlled delay line 104. For these measurements the wavelength of the Ti:sapphire laser 608 was fixed at 775 nm and the wavelength of the OPO 612 was tuned between 1290 and 1310 nm. No changes in the optical alignment of the two laser beams 120, 124 or the parameters of the photodiode 108 are made during the measurements, as the wavelength of the OPO 612 is tuned.

In the present experiment, a Gaussian shaped curve is assumed for the numerical description of the temporal profiles of both femtosecond laser pulses 120, 124. The width of the cross-correlation signal can then be calculated by $\Delta t_{cc} = ((\Delta t_1)^2 + (\Delta t_2)^2)^{1/2}$, where $\Delta t_1$ and $\Delta t_2$ are the FWHM of each laser pulse 120, 124. When fitting a Gaussian to the data points, the full widths of the measured cross-correlation signals are $\Delta t_{cc}$=(273±5) fs, (259±5) fs, and (248±5) fs (FIGS. 7–9), respectively. The durations of the laser pulses 120, 124 for the wavelengths $\lambda_1$=775 nm and $\lambda_2$=1300 nm are measured individually by standard conventional crystal auto-correlation techniques. By fitting Gaussians to these auto-correlation data, pulse durations of $\Delta t_1$=(130±6) fs (FWHM) and $\Delta t_2$=(214±10) fs (FWHM) are obtained. This gives a predicted cross-correlation width $\Delta t_{cc}$=(250±12) fs, which is in good agreement with the experimental results that are derived from the photodiode cross-correlation measurements using the present invention.

In FIG. 7, the power dependence of the two-color two-photon induced photocurrent in the photodiode 108 is shown as the power of the 1300 nm OPO 612 output is changed (between 0.1 and 40 mW) while the power of the Ti:sapphire laser 608 is fixed at a constant value (approximately 28 mW). In this measurement, the spot sizes of the laser beams 120, 124 on the photodiode are $\geq$5 mm$^2$ and the beam of the fixed Ti:sapphire laser 608 at 775 nm is chopped 204. In this way, the quadratic power dependence of the 1300 nm beam 124 itself is nulled out by the lock-in detection. A linear dependence of the photocurrent is obtained. This is due to the relation $I(v_1+v_2) \approx P(v_1) \cdot P(v_2)$, where I is the two-photon induced photocurrent and P(v) is the average power of the laser light at the frequency v. These data demonstrate the capability to measure cross-correlation functions for two ultrashort laser pulses 120, 124 of different wavelengths that differ in power by a factor of 100 or more.

The two-photon induced photocurrent signal depends on the focussing parameters of the laser beams 120, 124 on the photodiode 108. In the case of high laser intensities, saturation of the photocurrent could limit the possibility to measure cross-correlation or auto-correlation signals. Typical spot sizes for the laser beams in the present investigation are between 1 and 10 mm$^2$. For an average laser power of P=40 mW this gives a maximum peak pulse intensity of approximately 3.7 kW/mm$^2$. The linear response of the photocurrent signal that is shown in FIG. 7 indicates that saturation can be neglected for the conditions in the present experiment. However, the high peak intensities of the individual pulses result in a one-color two-photon induced photocurrent that constitutes a background signal. In order to minimize this background, lock-in techniques are used for data accumulation by chopping the less intense probe beam. Then the intensity of the more intense pump beam does not influence the cross-correlation signal (except possibly to add some noise) as long as it is below the saturation limit, which is reported to be approximately 40 MW/mm$^2$ for this GaAsP photodiode at 800 nm. For the cross-correlation signals in FIGS. 7–9, weak focussing (spot sizes $\geq$5 mm$^2$) is applied and the average laser powers are $P(\lambda_1)$=30 mW and $P(\lambda_2)$=45 mW; this gives a signal to background ratio of approximately 4:1.

The photodiode device 108 is also used to measure the temporal characteristics of femtosecond laser pulses 120, 124 that emerge from a NSOM fiber tip 816, as shown in FIG. 8. A single mode fused silica fiber 812 is used in which one end is heated by a CO$_2$ laser, pulled to a small diameter tip, and then coated with aluminum (thickness$\approx$120 nm) to form the NSOM-tip 816. When guiding a femtosecond laser pulse in this wavelength regime through the fiber 812, positive group velocity dispersion (GVD) induces a temporal broadening of the incident pulse width. Assuming Gaussian pulses, the relative change of the pulse duration due to the first order GVD can be calculated by, $$\Delta \tau_{rel} = \sqrt{1 + \left(\frac{1}{L_d}\right)^2}$$

with $L_d = \Delta t^2/(4 \cdot \ln 2 \cdot k_1)$, where $\Delta t$ is the initial duration of the laser pulse at FWHM, l is the length of the fiber and $k_1$ is the second order dispersion. For l=38 cm, $\Delta t$=125 fs and $k_1$=360 fs$^2$ cm$^{-1}$ the expected relative change is $\Delta \tau_{rel}$=2.63, giving $\Delta t$=329 fs for an input pulse duration of $\Delta t$=125 fs.

The positive GVD due to the fiber 812 can be compensated by a prism pair 804, 808 in the beam path before entering the fiber 812, as it is shown in FIG. 8. Both the pump and the probe pulse 120, 124 are coupled into the fiber (l=38 cm) 812. Typical average powers are $\leq$1 mW before entering the fiber 812, the wavelength is $\lambda$=780 nm, and the initial pulse width is $\Delta t$=(125±6) fs (FWHM). The prisms 804, 808 induce a negative GVD, which also results in a temporal pulse broadening. After passing only through the prisms 804, 808, a pulse duration $\Delta t$=(318±10) fs (FWHM) is measured at the photodiode 108 and depicted in FIG. 9. The negative GVD is compensated by the positive GVD in the fiber. For 1 mW average power before entering the fiber 812, the pulse width at the output of the NSOM-fiber tip 816 is measured to be $\Delta t$=(109±5) fs (FWHM), as shown in FIG. 10. The pulse duration $\Delta t$ is optimized by adding more or less prism glass into the beam path. This demonstrates the capability of the photodiode device 108 for measuring the timing, $\delta t$=0, as well as the femtosecond pulse durations in a NSOM experiment.

These experiments demonstrate that two-color two-photon induced photoconductivity in a diffusion type GaAsP photodiode 108 provides a simple tool for establishing the timing $\delta t$=0 over a wide range of wavelengths for two-color femtosecond experiments, as well as a simple device for measuring cross-correlations of ultrashort laser pulses 120, 124. Typical average laser powers which produce good cross-correlation signals are approximately 100 $\mu$W for the probe 120 and approximately 1 mW for the pump beam 124. The application of this device for measuring the temporal characteristics in a NSOM experiment is also investigated. When coupling pump and probe pulses into the NSOM fiber 812, near-field auto-correlation signals can be determined by measuring the two-photon induced photocurrent. Typical input average laser powers into the fiber are $\leq$1 mW. Such a cross-correlator has several advantages compared to conventional optical devices. Among other advantages, phase matching is not required and there is no need for an additional detector. A wide range of possible wavelength combinations is possible. In general, any photodiode 108 can be used for this device, depending on the band gap energy and the photon energy of the lasers, extending the useful wavelength range beyond that which is possible with the particular GaAsP photodiode 108 discussed here.

ADDITIONAL EMBODIMENTS

In addition to the standard configuration of auto-correlation/cross-correlation of picosecond and femtosecond pulses 120, 124 discussed earlier, several embellishments of the standard configuration, which would make the device more useful to a variety of users, are listed below:

(1) Variety of photodiode band gaps: The two-photon photocurrent which constitutes the signal of the device is completely overwhelmed by the one-photon photocurrent if either of the two incident pulses 120, 124 has a photon energy greater than the band gap of the semiconductor photodiode 108. For such wavelengths, the only option is to find another semiconductor with a band gap energy above that of the higher energy photon. For this purpose, the device could contain, in addition to the GaAsP photodiode 108 discussed previously, several photodiodes of various band gaps which could be rotated into the focal point of the two beams 120, 124. Some of the suitable materials with band gaps sufficiently different from GaAsP to warrant their inclusion in the device are Si, GaAs, GaP, and ZnSe. This addition would make the cross-correlator usable over a wider wavelength range (UV-VIS-IR) than discussed in the other embodiments.

(2) Integrated phase sensitive detection: A small chopper wheel 204 and a PC board-based lock-in amplifier 208 could be added to the device to allow the user to quickly change between simple two-photon photocurrent detection and the more sensitive phase detection scheme discussed earlier. The chopper wheel 204 would be very small and easily incorporated into the device housing. The PC board lock-in amplifier would most easily be implemented as a card in an auxiliary computer, but could also be integrated in the device housing.

(3) Reflective optics: Although in principle both reflective and refractive optical components could be used inside the device for beam manipulation, relective optics are the superior choice. Properly chosen reflective optics span larger wavelength regions than refractive optics, while introducing significantly less group velocity dispersion to femtosecond pulses.

(4) Phase shift measurements: The device could also provide measurements of the phase shift in a pulse which has a phase chirp as a function of frequency. By compensation of the phase of a portion of the frequency spectrum of one pulse, either internal or external to the device, the approximate value of the phase difference between the two pulses 120, 124 can be obtained. The phase shift as a function of frequency can be reconstructed by a Fourier transform of the cross-correlated signal.

(5) Interferometric cross-correlation option: By addition of a piezo-electric transducer to the variable arm of the interferometer, path differences on the order of one hundredth of the wavelength ($\lambda/100$) can be applied to this optical path, allowing interferometric accuracy in measurement of the auto-correlation or cross-correlation signal. The interferometric signal provides information about the frequency chirp of the pulse 120, 124 which is not available from simple phase-averaged auto-correlation or cross-correlation.

(6) Near-field scanning optical microscope (NSOM) application: This device can also be used in a NSOM-setup to measure the temporal characteristics of femtosecond pulses in the near-field of an optical fiber tip 816. Either one pulse is coupled into the fiber while the other one is directed directly onto the photodiode 108 or both pulses are coupled into the NSOM-fiber 812.

(7) Amplitude Modulation of Laser Pulses: Recent experiments on a GaAsP photodiode 108 have shown that it is possible to separate the purely two-photon photocurrent from any photodiode 108 (i.e., not just GaAsP) from the one-photon photocurrent by means of lock-in detection. This technique will allow photodiodes with large concentrations of energy levels within the band gap to be successfully implemented in this scheme of this invention. This problem arises because some photodiodes have large concentrations of energy levels within the band gap, which may generate a one-photon photocurrent even when the photon energies of a first beam and second beam, both incident on the photodiode 108, are below the band gap energy. In general, the two-photon photocurrent also exists, but may be obscured by the large one-photon photocurrent described above, rendering auto- and cross-correlations much more difficult To separate the one-photon photocurrent from the two-photon photocurrent, the first beam is amplitude modulated at first frequency $f_1$, and the second beam is amplitude modulated at second frequency $f_2$ and the photocurrent signal from the photodiode 108 is connected to the input of a lock-in amplifier 208, or other demodulation device, which demodulates this signal at either the sum or different frequency of the two modulation frequencies, i.e., $(f_1+f_2)$, or $(|f_1-f_2|)$. In the special case where $f_1=f_2$, demodulation is performed at the sum frequency, $(f_1+f_2)$. With this detection method, one-photon photocurrents do not contribute to the signal, and the purely two-photon photocurrent, necessary for auto- and cross-correlation, is measured. In cases where the one-photon photocurrents are extremely large, a notch filter at frequencies $f_1$ and/or $f_2$ may be required to eliminate signal components at these frequencies before the signal reaches the lock-in amplifier 208, so as to avoid saturation of the first amplifier stage.

(8) Lowering Background One-photon Photocurrent: In order to further discriminate against one-photon photocurrents which contribute to the background photocurrent, the probe pulse (i.e., the known, characterized pulse) can be chosen so that its photon energy, $E_1$, is as low as possible while still satisfying the requirement $E_1+E_2 \geq E_G$. This choice is advantageous because the probability of producing a one-photon photocurrent generally decreases as the photon energy of the light decreases. In this way the one-photon photocurrent contribution of the probe pulse to the background photocurrent is significantly reduced and/or eliminated.

Additionally, manipulating the relative intensity between the probe and uncharacterized pulses significantly reduces the one-photon photocurrent contribution of the uncharacterized pulse to the background photocurrent. This is accomplished by making the intensity of the uncharacterized pulse $I_2$ as small as possible so that the uncharacterized pulse does not itself create a significant one-photon photocurrent. At the same time, if the probe pulse intensity $I_1$ is made very large, (while its photon energy remains as small as possible, consistent with the above constraint), the two-photon photocurrent will be maximized compared to the one-photon photocurrents. The disparity in intensities tends to assure each of the relatively scarce uncharacterized pulse's photons will create a two-photon process by combining with the abundant probe pulse photons. The probe pulse's one-photon photocurrent is small because its photon energy is low. The uncharacterized pulse's one-photon photocurrent is small because its intensity is kept low, even if the uncharacterized pulse has a relatively high photon energy $E_2$ which would normally have a high probability of producing one-photon photocurrents. Using both of the aforementioned techniques allows the cross-correlation signal, which is proportional to the product of the intensities $I_1$ and $I_2$, to remain large, while the magnitude of the one-photon photocurrents of both pulses remains small. These techniques allow virtual elimination of the one-photon contribution to the background photocurrent.

With the miniaturization of laser devices several new applications of laser technology become important in various fields of industry, medicine and fundamental research. In this context ultrashort lasers are of particular interest. However, there is still a lack of miniaturized diagnostic tools for these lasers, such as devices to measure ultrashort laser pulse durations, phase shifts and the timing of different laser pulses 120, 124. Here are some ideas how this new photodiode 108 based cross-correlator can be applied to more technological relevant problems:

(1) Medical applications: Recently femtosecond laser pulses 120, 124 have been applied as an alternative method for tomography. Time-correlated measurements of these ultrashort laser pulses are used for imaging structures in tissue. Then the accurate knowledge of the temporal characteristics of the laser pulses (duration and timing) 120, 124 is essential. Also multi-color correlation measurements may be of advantage in the future.

Picosecond laser pulses 120, 124 find also applications in cancer therapy and diagnostics. Specific drugs are applied that accumulate in cancer cells but not in healthy tissue. These drugs and the tissue show differences in the time-correlated spectrum after excitation with short laser pulses. This time contrast is then used for the diagnostics.

In all of these applications the replacement of conventional optical auto- and cross-correlators by this new device will give new impacts for future developments in the same way as recent improvements of the lasers (e.g., diode laser technology).

(2) Telecommunication: In future developments, calibration of ultrashort laser pulses 120, 124 might also be here of particular interest. Then the diagnostics of the applied laser pulses 120, 124 will be essential, e.g., measuring pulse broadening due to dispersion of the pulses in the fiber cables. Therefore, as an example, the cross-correlation of the laser pulse at the output of the fiber 812 with a reference pulse of known duration and pulse shape will become important. This new and miniaturized photodiode cross-correlator can be applied very easily for this kind of measurements.

(3) Industrial process control: Phase-shift measurements and holography are standard methods in industrial process control to monitor the flatness of surfaces. Contrary to continuous wave lasers, the application of pulsed lasers will allow obtaining this information in real time.

Recently picosecond (ps) laser spectroscopy has been shown to be useful in the diagnostics of high pressure and temperature combustions. With the miniaturization of powerful picosecond laser systems (diode lasers and diode laser amplifiers) the disclosed cross-correlation technique may become useful in the automobile industry to improve emission and efficiency of existing engines. Again, the measurement of the temporal characteristics of the applied laser pulses is essential.

The forgoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. A method of cross-correlating radiation pulses, comprising the steps of:

focusing a first radiation pulse on a photodiode, the first radiation pulse having a first intensity and a first wavelength;

focusing a second radiation pulse on the photodiode where the first and second radiation pulses illuminate a common point on the photodiode, the second radiation pulse having a second intensity and a second wavelength, wherein the first wavelength and second wavelength are different;

converting the first and second radiation pulses into a photocurrent using a photodiode, wherein a product of the first and second intensities is proportional to the photocurrent; and detecting an amplitude of the photocurrent while delaying at least one of the first and second radiation pulses.

2. The method of cross-correlating radiation pulses of claim 1, wherein the first and second radiation pulses simultaneously illuminate the common point.

3. The method of cross-correlating radiation pulses of claim 1, wherein the first wavelength and second wavelength differ by at least five parts in eighty.

4. The method of cross-correlating radiation pulses of claim 1, further comprising the step of delaying at least one of the first and second radiation pulses so that the first radiation pulse is coincident in time with the second radiation pulse at the common point of the photodiode.

5. The method of cross-correlating radiation pulses of claim 1, further comprising the step of determining the product of the first intensity and the second intensity from the amplitude of the photocurrent.

6. The method of cross-correlating radiation pulses of claim 1, further including the steps:

modulating the first radiation pulse with a first frequency;

modulating the second radiation pulse with a second frequency; and demodulating at least one of:

a sum of the first frequency and the second frequency, and an absolute value of a difference between the first frequency and the second frequency.

7. The method of cross-correlating radiation pulses of claim 1, further comprising the step of chopping at least one of the first radiation and second radiation pulses to allow for more accurate determination of an amplitude of the photocurrent.

8. A cross-correlation method including the steps of:

providing a first radiation pulse and a second radiation pulse, wherein the first and second radiation pulses have different wavelengths;

processing the first and second radiation pulses in a non-linear way such that a two-photon process occurs; and generating a signal representative of a first radiation pulse intensity and a second radiation pulse intensity, wherein the processing and generating steps are performed by the same photodiode.

9. The cross-correlation method of claim 8, further comprising the step of delaying at least one of the first and second radiation pulses so that the first radiation pulse is coincident in time with the second radiation pulse at a common point on the photodiode.

10. The cross-correlation method of claim 8, further including the steps:

modulating the first radiation pulse with a first frequency;

modulating the second radiation pulse with a second frequency; and demodulating at least one of:
a sum of the first frequency and the second frequency, and
an absolute value of a difference between the first frequency and the second frequency.

11. A multi-wavelength cross-correlation system for radiation pulses, comprising:
a first radiation pulse;
a second radiation pulse, wherein the first and second radiation pulses have different wavelengths;
a radiation detection means having a surface, the radiation detection means converting energy from the first radiation pulse and the second radiation pulse into a current, the first radiation pulse contacting a first area on the surface of the radiation detection means and the second radiation pulse contacting a second area on the surface of the radiation detection means wherein the first and second areas overlap on the surface; and
wherein a product of intensities of the first and second radiation pulses is proportional to said current; and
a current sensing means which determines an amplitude of the current.

12. The multi-wavelength cross-correlation system of claim 11, wherein the overlap of the first and second areas is located on a p-type layer of the photodiode.

13. The multi-wavelength cross-correlation system of claim 11, wherein:
the first and second radiation pulses have first and second photon energies, respectively;
the photodiode has a band gap energy; and
each of the first and second photon energies is less than the band gap energy.

14. The multi-wavelength cross-correlation system of claim 11, wherein the multi-wavelength cross-correlation system is free of a non-linear crystals.

15. The multi-wavelength cross-correlation system of claim 11, further comprising an interferometer, in communication with at least one of the first and second radiation pulses.

16. The multi-wavelength cross-correlation system of claim 11, wherein the photodiode operates as both a non-linear element and detector.

17. The multi-wavelength cross-correlation system of claim 11, wherein a power of the first and second radiation sources varies by at least two orders of magnitude.

18. The multi-wavelength cross-correlation system of claim 11, further comprising an optical delay means operatively engaging at least one of the first radiation and second radiation pulses for altering the length of an optical path of at least one of the first and second radiation pulses for adjusting a temporal alignment of the first radiation pulse with the second radiation pulse.

19. The multi-wavelength cross-correlation system of claim 11, further comprising a radiation chopping means operatively engaging at least one of the first radiation and second radiation pulses, the radiation chopping means being coupled to the current sensing means.

20. The multi-wavelength cross-correlation system of claim 11, wherein the radiation detection means is comprised of a plurality of photodiodes, wherein each photodiode has different band gap characteristics.

* * * * *